Patented Sept. 13, 1949

2,481,493

UNITED STATES PATENT OFFICE 2,481,493

PREPARATION OF SILICA ZIRCONIA GEL

Richard W. Blue, Bartlesville, Okla., assignor to Houdry Process Corporation, Wilmington, Del., a corporation of Delaware No Drawing. Application November 10, 1947, Serial No. 785,193

13 Claims. (Cl. 252—452)

The present invention relates to the preparation of gel catalysts comprising essentially silica and zirconia, and is particularly concerned with the direct preparation of such catalysts from naturally occurring zirconium silicates ores or readily available refractory materials of like composition.

In accordance with the invention a naturally occurring zirconium silicate ore or by-product slag or other readily available refractory material comprising silica and zirconia is melted in an alkaline flux and the melt, after adjustment of $SiO_2/ZrO_2$ ratio if required (as by addition of silicate), is then dispersed in water or aqueous solution. Acidic materials are subsequently added to the alkaline dispersion to form a sol of pH 2.5–8.0, which sol sets to a gel comprising silica-zirconia. The gel may also contain other metallic oxides derived from the ore which oxides may in themselves be catalytically active or serve as promoters in silica-zirconia catalysts, such as alumina. Soluble impurities which are undesirable in catalysts of this type are removed from the gel in the wet or dried form.

As starting material for the preparation of the catalysts according to the invention, there may be employed natural silicious ores of high zirconia content such as the zircon ores and altered zircons, zirkite, baddeleyite, etc. Starting materials containing fairly high content of certain metallic impurities such as compounds of iron, nickel, etc., in the order of 5% or more by weight of the ore composition are best avoided, otherwise it may be necessary to complicate the process with accompanying increased preparation costs for the selective removal of these impurities from the melts or from the alkaline dispersions or solutions.

Zirconium mineral compositions of the type described that are themselves infusible can be readily fused at temperatures of about 1000° F. or less in an alkaline melt such as caustic alkali containing a small quantity of alkali metal fluoride. The caustic melt should be several times the quantity (by weight) of the zirconium mineral to be treated.

The melt containing the zirconia and silica in a more soluble form because of the combination with alkali, is allowed to cool and broken up or milled to form small lumps or more finely divided product, which can then be dispersed or dissolved in water or aqueous alkaline solutions. At this point the ratio of $SiO_2/ZrO_2$ may be adjusted to the desired range by the addition of alkali metal silicate solution, by intimate mixing and milling the latter with the fused zirconium product. Catalysts of desired properties for cracking of hydrocarbons and related hydrocarbon conversion operations can be obtained with silica and zirconia in the ratios of 95/5 to 80/20 by weight. It should be understood that these ratios represent practical ranges but that other ratios of less or greater zirconia content may be employed with, however, increasing possibilities of less desirable characteristics such as poorer stability and decreased desirable activities.

The obtained aqueous slurry of alkaline zirconium and silicate compounds is adjusted to required pH for formation of sols setting to hydrogels of desired properties. This may be accomplished by adding a required amount of acid or by adding excess acid followed by weak alkaline material, such as ammonium hydroxide or sodium acetate. The sol is then permitted to stand for the necessary period for hydrogel formation.

After the hydrogel has been set, it may be processed in known manner for preparation of synthetic gel catalyst. Generally the hydrogel will be washed in water or acidic or base exchanging solutions, with or without previous drying. The dry gel may be broken into lumps or ground to powder of required size depending upon the type of catalytic conversion system in which it is to be employed. More regular shapes such as pellets can be formed by extrusion with suitable addition of binders or plasticizing agents if required or by other methods of molding. The dried gel catalyst in pellet, powder, or granule form may be directly employed in a hydrocarbon conversion process wherein it will be heat-treated during initial use to reach its stable activity incident to the high temperature encountered in the process and in periodic regeneration; however, it is preferred to calcine the catalyst or to precondition the same by heat treatment at temperatures above 600° F. prior to use, in air with or without added steam, or in steam alone.

Example I

The zirconium silicate mineral employed in this example for preparation of gel was a form of zircon known as zirkosil, in finely divided state (90% through 200 mesh) and had the following typical analysis:

| | Per cent |
|---|---|
| Zr as $ZrO_2$ | 66.98 |
| Si as $SiO_2$ | 31.50 |
| Al as $Al_2O_3$ | 0.60 |
| Ti as $TiO_2$ | 0.29 |
| P as $P_2O_5$ | 0.07 |
| Fe as $Fe_2O_3$ | 0.07 |
| Water @ 105° | 0.01 |
| Ig. loss | 0.17 |

400 parts by weight of solid caustic soda were fused in a crucible and 20 parts of sodium fluoride added with continued heating of the melt to a dull red (950–1000° F.) at which time 100 parts by weight of the above zirconium silicate mineral were added while stirring the melt.

The melt was poured out and allowed to cool, after which the cold material was broken up and ball-milled for approximately one hour with the addition to 417 parts thereof of 3500 parts by weight of commercial water glass solution ("N-Brand," $SiO_2$-3.2 $Na_2O$) of 1.25 specific gravity, containing about 20% by weight $SiO_2$. A milky suspension was obtained. Some light material settled out, but was resuspended by agitation. The composition above was calculated to obtain a theoretical weight ratio of 93 silica to 7 zirconia.

To one volume of the above suspension there was added 5 volumes of an acid solution containing 32 grams sulfuric and 39 grams of acetic acid per liter, which mix was mechanically agitated to form a sol which set in 15 minutes to a hydrogel of 5.3 pH with a product concentration of 50 grams per liter.

The wet gel was permitted to stand for two hours, then broken up and dried in an oven. The dried gel was washed with water and ammonium chloride solutions, then again dried. The dried product was granulated and pressed into pellets, which were conditioned by treatment for 10 hours at 1400° F. in 95% air and 5% steam (by volume).

The catalyst so prepared was employed as a fixed bed in cracking a test stock of light East Texas gas oil under the following conditions: 790° F., atmospheric pressure, liquid space rate (vols. oil charged/vol. cat./hr.) 1.5, ten minutes operating period. There was obtained from the charge an average yield of 33.9 vol. per cent gasoline, with the production of 1.8% coke by weight of charge, and 2.6% by weight fixed gas.

Analysis of the dried gel showed a content exclusive of volatiles removable by ignition (proportions by weight) of 91.25 $SiO_2$, 5.47 $ZrO_2$, 1.30 $Al_2O_3$, 0.16 $Fe_2O_3$ and 0.06 $Na_2O$.

Example II

To 265 parts of a cooled and broken up alkaline zircon melt, obtained as in the preceding example, there was added about 2220 parts (by weight) of the heretofore described sodium silicate solution to obtain an adjusted theoretical weight ratio of 93 parts $SiO_2$ to 7 parts $ZrO_2$. The mixture was similarly milled to obtain a suspension. 7.3 volumes of a mixed acid solution of the composition heretofore employed were added to 1.5 volumes of the alkaline slurry and the two compositions mechanically agitated, resulting in the formation of a hydrogel of 5.2 pH.

The wet gel was broken up, dried and purified as before and similarly pelleted and heat treated.

The catalyst pellets thus obtained, gave an average yield of 35.2 volume percent gasoline, with the production of 1.8% by weight of coke and 4.5% by weight gas, in cracking of the gas oil under substantially similar conditions of the preceding test.

Example III (a) Other gels were prepared by addition of excess acid to the alkaline slurry of the zircon melt and added silicate solution, followed by the addition of a sodium acetate solution until a small amount of flocculent precipitate appeared. The sol thus obtained set to gel on standing.

(b) In another experiment, the alkaline slurry was admixed with dilute hydrochloric acid to pH<3 and then ammonium hydroxide was added dropwise. Precipitation occurred when the pH reached 3.25.

(c) Another sample of the ball-milled mixture was dispersed in 10% sodium hydroxide solution and added slowly to 10% HCl solution with mechanical agitation until the mixture was red with Thymol Blue indicator. Sodium acetate was then added until the indicator turned yellow. The sol which was opalescent before sodium acetate addition now cleared up completely and set to a gel on standing.

In the use of the catalysts of the present invention for conversion of hydrocarbons, the usual conditions of cracking can be availed of without modification, the catalyst being in the form of fine particles, granules, globules, pellets or the like. The described catalyst can be employed in fixed bed processes for cracking of petroleum fractions as well as in processes in which the catalyst moves through the reaction zone. As an example of a fixed bed operation, cracking may be carried out at a temperature of 800–900° F., employing a space rate (volume of charge liquid basis per volume of catalyst per hour) of about 1.5 and a pressure of about 15 pounds per square inch gauge. The temperature, of course, may be varied within the range of about 700 to 1100° F., the space rate within the range of about 0.5 to 8 and pressures may be employed from about atmospheric or slightly lower up to about 100 pounds per square inch or higher. Under these conditions the operating period "on stream" may range from five to sixty minutes, for example 10 to 30 minutes alternating with regeneration periods. In commercial operation temperatures above 800° F. are preferred. Steam may be added to the charge stock and is particularly advantageous in assisting the vaporization of heavier stocks.

In processes other than the fixed bed, such as where the catalyst moves or is moved through the reaction zone, the conditions employed may be such as to subject the oil to substantially equivalent conditions including contact time and ratios of oil to catalyst as those set out above in connection with the fixed bed process.

Reforming may be carried out in accordance with the invention by charging a virgin or cracked gasoline or naphtha fraction under conditions similar to those employed in cracking.

Whereas in the fixed bed operation the catalyst is alternately subjected to regeneration, in the other processes the catalyst is passed during its cycle through a separate regeneration zone. In all of these processes regeneration is effected by contacting the catalyst after use, with air of other oxygen-containing gas to burn off carbonaceous deposit.

Obviously many modifications and variations of the invention as hereinbefore set forth may be made without departing from the spirit and scope thereof and therefore only such limitations should be imposed as are indicated in the appended claims.

I claim as my invention:

1. The process of preparing silica zirconia gel, which comprises fusing a zirconium silicate ore in an alkaline flux, adding alkaline silicate to the flux in required quantity to furnish a silica/zirconia weight ratio in the range of 95/5 to 80/20, dispersing the obtained product in aqueous medium and adding acidic material to the dispersion in quantities sufficient to adjust the pH within the range of 2.5 to 8.0, thereby effecting formation of a colloidal sol setting to a hydrogel.

2. The process of preparing active hydrocarbon conversion catalysts in gel form from zirconium silicate refractory materials, which comprises fusing such a refractory material in an alkaline flux, thoroughly incorporating with the obtained melt an alkaline silicate in an amount to furnish a desired silica/zirconia ratio in the mixture, dispersing the mixture in aqueous medium, adjusting the pH of the dispersion to a pH in the range of 2.5 to 8.0 to obtain a colloidal sol, setting said sol to a hydrogel, and drying the obtained hydrogel.

3. The process of claim 2 including the step of purifying the hydrogel for removal of alkali metal ions therefrom.

4. The process of claim 2 including the step of washing the hydrogel in aqueous medium to remove soluble impurities therefrom.

5. The process of claim 2 wherein said flux is composed essentially of caustic alkali and alkali metal fluoride.

6. The process in accordance with claim 2, wherein the starting refractory material is a natural zirconium ore containing less than 5% by weight of compounds of the iron and nickel group.

7. The process of claim 6 wherein said natural zirconium ore is one of the zircon type.

8. The process of claim 2 wherein the quantity of alkaline silicate added is sufficient to adjust the weight ratio of silica/zirconia in the dried gel to the range of 95/5 to 80/20.

9. The process of preparing gel catalysts comprising silica-zirconia from natural zirconium silicate ores, which comprises fusing such an ore in the presence of caustic containing a minor amount of alkali metal fluoride, milling the melt together with added alkaline silicate solution, forming an aqueous alkaline dispersion of the milled product, adjusting the pH of the dispersion to 2.5 to 8.0 pH, permitting the colloidal sol thereby obtained to set to a hydrogel, and drying the obtained hydrogel.

10. The process in accordance with claim 9 wherein said natural ore also comprises alumina.

11. The process of claim 9 including the step of calcining the dried hydrogel.

12. The process of preparing silica-zirconia gel catalyst pellets which comprises subjecting a mineral consisting chiefly of zirconium silicate to fusion with caustic soda and sodium fluoride, cooling the obtained melt, granulating the cooled product, milling the granulated product with aqueous sodium silicate solution to form an aqueous suspension, adding acid to said suspension in an amount sufficient to produce a mixture of 2.5 to 8.0 pH, and agitating the obtained mixture to form a sol, permitting the sol to set to a hydrogel, drying the hydrogel, base-exchanging the dried product to remove alkali metal ions, and forming the purified product into pellets.

13. The process of claim 12 including the step of conditioning the catalytic activity of the obtained final pellets by heat treatment in an atmosphere containing steam.

RICHARD W. BLUE.

REFERENCES CITED

The following references are of record in the file of this patent:

UNITED STATES PATENTS

| Number | Name | Date |
|---|---|---|
| 2,088,281 | Smith | July 27, 1937 |
| 2,289,918 | Lee et al. | July 14, 1942 |
| 2,382,239 | Lee | Aug. 14, 1945 |
| 2,400,465 | Marisic | May 14, 1946 |

FOREIGN PATENTS

| Number | Country | Date |
|---|---|---|
| 392,954 | Great Britain | May 22, 1933 |

OTHER REFERENCES

Bureau of Mines, Information Circular IC7341, February, 1946, page 4.